US007835482B2

(12) United States Patent
Sato et al.

(10) Patent No.: US 7,835,482 B2
(45) Date of Patent: Nov. 16, 2010

(54) EMERGENCY CORE COOLING SYSTEM (75) Inventors: Takashi Sato, Yokohama (JP); Hirohide Oikawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 568 days.

(21) Appl. No.: 11/033,272

(22) Filed: Jan. 12, 2005

(65) Prior Publication Data
US 2005/0220259 A1    Oct. 6, 2005

(30) Foreign Application Priority Data
Jan. 14, 2004   (JP)   ............................. 2004-007349

(51) Int. Cl.
*G21C 9/00* (2006.01)
(52) U.S. Cl. .................. 376/282; 376/283; 376/298; 376/299
(58) Field of Classification Search .............. 376/282, 376/283, 293, 298, 299
See application file for complete search history.

(56) References Cited
U.S. PATENT DOCUMENTS

| 4,808,369 | A | * | 2/1989 | Yamanari et al. | ........... 376/282 |
| 4,818,475 | A | * | 4/1989 | Gluntz et al. | ............... 376/282 |
| 5,059,385 | A | * | 10/1991 | Gluntz et al. | ............... 376/282 |
| 5,303,274 | A | * | 4/1994 | Sawyer | ....................... 376/283 |
| 5,349,616 | A | * | 9/1994 | Nakayama et al. | .......... 376/282 |
| 5,426,681 | A | * | 6/1995 | Aburomia | .................... 376/283 |
| 5,577,085 | A | * | 11/1996 | Gou et al. | .................... 376/293 |
| 5,761,262 | A | * | 6/1998 | No et al. | ...................... 376/298 |
| 6,249,561 | B1 | * | 6/2001 | Aburomia | .................... 376/283 |
| 6,885,720 | B2 | * | 4/2005 | Fennern | ...................... 376/283 |
| 2002/0101951 | A1 | * | 8/2002 | Nakamaru et al. | .......... 376/282 |

FOREIGN PATENT DOCUMENTS

| JP | 7-253492 | 10/1995 |
| JP | 08-313686 | 11/1996 |
| JP | 11-030685 | 2/1999 |
| JP | 2000-275380 | 10/2000 |
| JP | 2002-122689 | 4/2002 |

OTHER PUBLICATIONS

Takashi Sato, "Basic Philosophy of the Safety Design of the Toshiba Boiling Water Reactor," Nuclear Technology vol. 99 Jul. 1992 (pp. 22-35).

Takashi Sato and Yoshihiro Kojima, "Variations of a Passive Safety Containment for a BWR With Active and Passive Safety Systems," Nuclear Engineering and Design 237 (2007) 74-86.

* cited by examiner

*Primary Examiner*—Rick Palabrica
(74) *Attorney, Agent, or Firm*—Oblon, Spivak, McClelland, Maier & Neustadt, L.L.P.

(57) ABSTRACT

An emergency core cooling system comprises first and second safety divisions for an active emergency core cooling system. Each of the first and second safety divisions is provided with a high-pressure core cooling system and a low-pressure core cooling system, which also acts as a residual heat removal system.

10 Claims, 6 Drawing Sheets

EMERGENCY CORE COOLING SYSTEM

BACKGROUND OF THE INVENTION

1. Field of the Invention

The present invention relates to an emergency core cooling system (ECCS) of a nuclear power plant particularly of a boiling water reactor (BWR).

2. Related Art

The most recently known BWR is an advanced boiling water reactor (ABWR). The ECCS of the ABWR is divided into three sections. The safety of the ABWR of such type has been significantly improved compared with previously known ECCSs each including only two divided sections.

The outline of the ECCS of a known ABWR having divided three sections will be described hereunder with reference to FIGS. 6 and 7.

Figure 6:
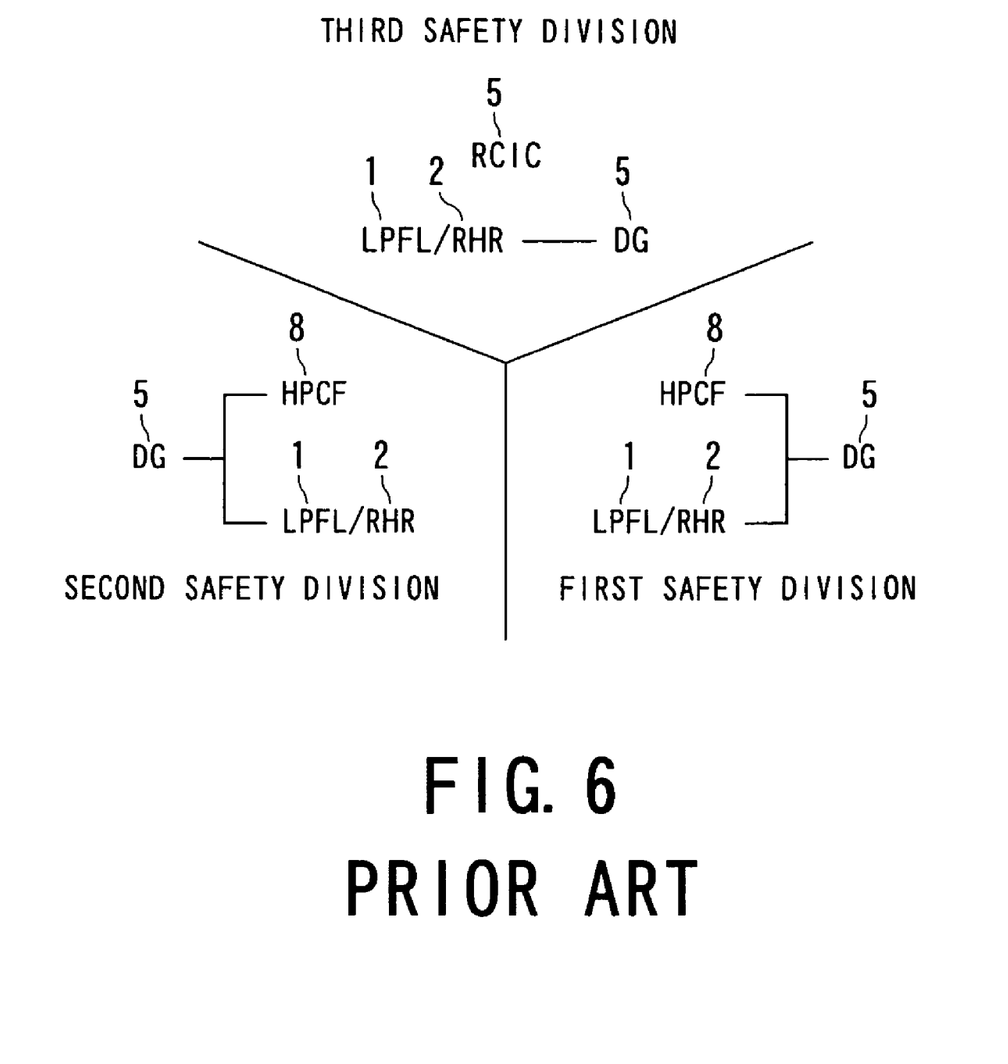
FIG. 6 is an illustration showing a front line of a known ECCS used in a known advanced boiling water reactor (ABWR)

FIG. 6 is a schematic view of a front line of the ECCS of a known ABWR divided into three sections including first, second and third safety divisions. As illustrated in FIG. 6, each safety division of the ECCS includes a low-pressure flooding system (LPFL) 1, a residual heat removal system (RHR) 2, a reactor component cooling system (RCW) 3, not shown in FIG. 6, a reactor component sea water cooling system (RSW) 4, not shown in FIG. 6, and an emergency diesel generator (DG) 5.

A high-pressure core flooding system (HPCF) 8 is provided for the first and second safety divisions, and a reactor core isolation cooling system (RCIC) 7 is provided for the third safety division. For convenience, the components of the ECCS illustrated in FIG. 6 are referred to as the 'front line' of the ECCS. Each of the areas sectioned by a physical separation wall is referred to a 'safety division'. The safety divisions are designed based on safety so as to isolate one area from another during an incident, such as fire or flooding, that might occur inside a nuclear power plant and threaten the safety of the nuclear power plant. By isolating the safety divisions from each other, even if such an incident occurs in one safety division, the other safety divisions can be kept unaffected.

Figure 7:
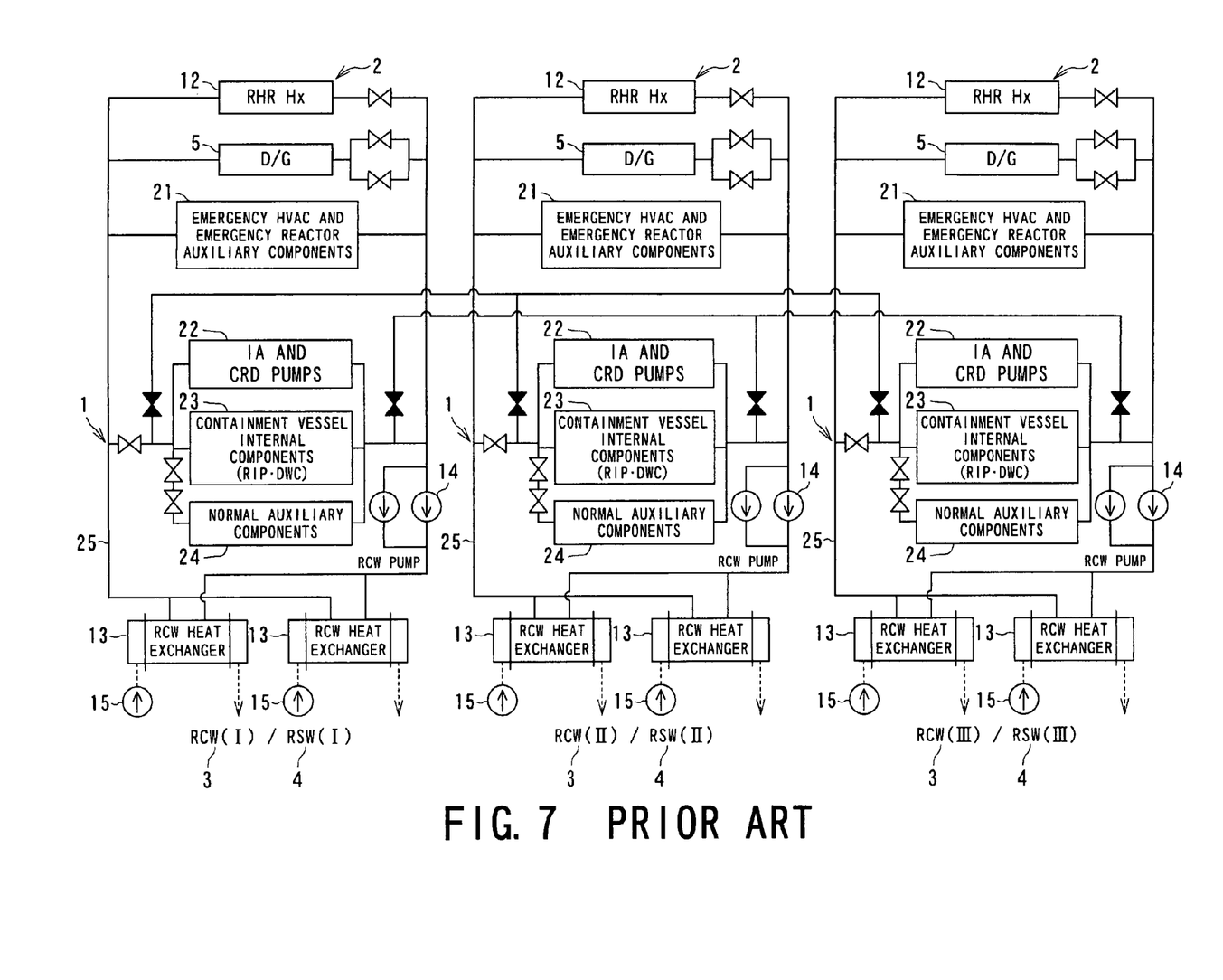
FIG. 7 is a schematic diagram of a support line of a known ECCS used in a known ABWR.

FIG. 7 is a schematic view of a support line of the ECCS of a known ABWR illustrating a mechanism for cooling the heat generated in a nuclear reactor and a primary containment vessel.

As illustrated in FIG. 7, each of the three systems includes the RCW 3 and RSW 4, respectively, and the same reference numerals indicate the same components in each of the three systems. Each system includes a RHR heat exchanger (RHR Hx) 12, RCW pumps 14, RSW pumps 15, an emergency heat-ventilating and air-conditioning system (HVAC) and emergency reactor auxiliary components 21, an IA and CRD pumps 22, containment vessel internal components (reactor internal pump (RIP) and drywell cooler (DWC)) 23, normal auxiliary components 24, and an RCW loop (circulation pipes) 25.

In each system, the LPFL 1 and the RHR 2 share pumps to send water to the RHR Hx 12 by circulating the water in the reactor or in the suppression pool inside the primary containment vessel to cool the reactor and the primary containment vessel. The heat from the reactor and the primary containment vessel is transmitted to the RHR Hx 12 and is cooled at the RCW 3. Then, the heat transmitted to a RCW heat exchanger (RCW Hx) 13 is cooled by sea water.

Since, as mentioned above, the ECCS for cooling the reactor and the primary containment vessel of the ABWR is divided into three sections, the possibilities of accidents due to failure of cooling occurring are significantly reduced compared with other known ABWRs. Hereinafter, for the sake of convenience, the RCW 3 and the RSW 4 are referred to as the 'support line' of the ECCS.

However, the above-described reactor cooling system of the ABWR requires piping for each loop of the RCW 3 or, in other words, requires three sets of piping. The cost of the piping for each RCW 3 makes up the largest proportion of the entire cost of the ABWR. Thus, the cost of the above-described ABWR is no less than the cost for other previously known reactors.

Figure 8:
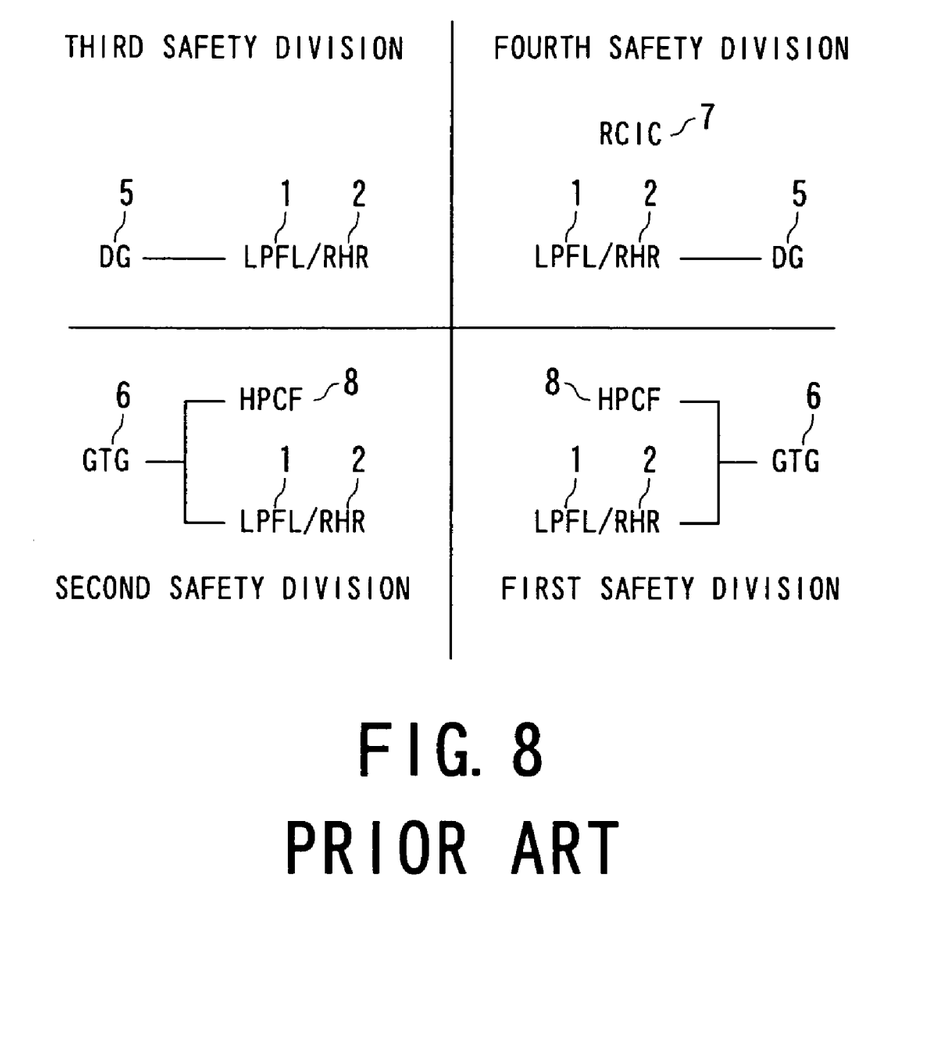
FIG. 8 is an illustration showing a front line of a known semi-four-section ECCS used in a known ABWR.

In order to solve the above-mentioned problems or inconveniences, a semi-four-section ECCS has been provided. This semi-four-section ECCS comprises a two-loop reactor cooling system, wherein the front line is divided into four safety divisions, as illustrated in FIG. 8 (for example, refer to Japanese Unexamined Patent Laid-open Publication No. 2000-275380).

In this way, cost efficiency, operating rate, and safety are improved in comparison with a full-three-section ECCS for the known ABWR such as mentioned above.

The front line of the semi-four-section emergency core cooling system (ECCS) is divided into four sections. However, these four systems provided for the four sections of the front line are more systems than necessary. In addition, four emergency power supplies are required for the four systems. As a result, the ECCS becomes expensive and large in size.

Especially, in order to improve the safety of a next-generation BWR plant, a passive containment cooling system (PCCS) independent from the active ECCS is disposed so that the cooling ability and the reliability of the primary containment vessel are maintained even when the ECCS completely loses its functions. In this way, the next-generation BWR plant has achieved extremely advanced multiple-levels of protection.

Moreover, recently an innovative reactor containment vessel having both a double containment function and an air cooling function has been introduced. By employing this containment vessel, the safety of the next-generation BWR plant has been enhanced significantly. Even after the water source of the PCCS is exhausted, the containment vessel can be naturally cooled by outside air. The containment vessel is compact and stores active components and heat exchangers in a compartment located in the lower part of the primary containment vessel. However, a known active ECCS comprises a large number of components, which makes it difficult to arrange all the components inside the compact containment vessel.

SUMMARY OF THE INVENTION

Taking into consideration this problem, an object of the present invention is to satisfy a requirement for improving a design of the ABWR and the semi-four section ECCS and to provide an optimal ECCS for the next-generation BWR plant that is less costly and less space-consuming.

The above and other objects can be achieved according to the present invention by providing an emergency core cooling system (ECCS) comprising a first safety division for an active emergency core cooling system, and a second safety division for an active emergency core cooling system, each of the first and second safety divisions including a high-pressure core cooling system and a low-pressure core cooling system, which is commonly used as a residual heat removal system.

In a preferred embodiment of the above aspect, the emergency core cooling system may further comprise an emergency diesel generator provided for each of the first and second safety divisions, the emergency diesel generator operating as an emergency power supply equipment for supplying electricity to each of the first and second safety divisions.

In a modification, the emergency core cooling system may further comprise an emergency diesel generator provided for the first safety division and an emergency gas turbine generator provided for the second safety division, the emergency diesel generator and emergency gas turbine generator operating as emergency power supply equipments for supplying electricity to the first and second safety divisions, respectively.

In another modification, the emergency core cooling system may further comprise an emergency gas turbine generator provided for each of the first and second safety divisions, the emergency gas turbine generator operating as an emergency power supply equipment for supplying electricity to each of the first and second safety divisions.

The emergency core cooling system may further comprise a third safety division including a passive cooling system. The passive cooling system may include a passive containment vessel cooling system and an isolation condenser.

According to the present invention of the structures and characters mentioned above, a simple but highly reliable optimal hybrid safety system including a static safety system and an active ECCS may be provided for a next-generation nuclear reactor, preferably of BWR. More specifically, the numbers of active ECCSs and RHR heat exchangers can be significantly reduced with minimal effect on the design of the BWR. According to the present invention, an active ECCS may be disposed inside a containment vessel of a next-generation BWR having a reduced-size double containment vessel.

The nature and further characteristic features may be made more clear from the following descriptions made with reference to the accompanying drawings.

DESCRIPTION OF THE PREFERRED EMBODIMENTS

Preferred embodiments of the present invention will be described hereunder with reference to FIGS. 1 to 5, in which the same components as those illustrated in FIGS. 6 and 7 are indicated by the same reference numerals, and descriptions for components that have already been described with reference to FIGS. 6 and 7 are omitted herein.

An active emergency core cooling system (ECCS) according to a first embodiment of the present invention will be first described with reference to FIGS. 1 and 2.

Figure 1:
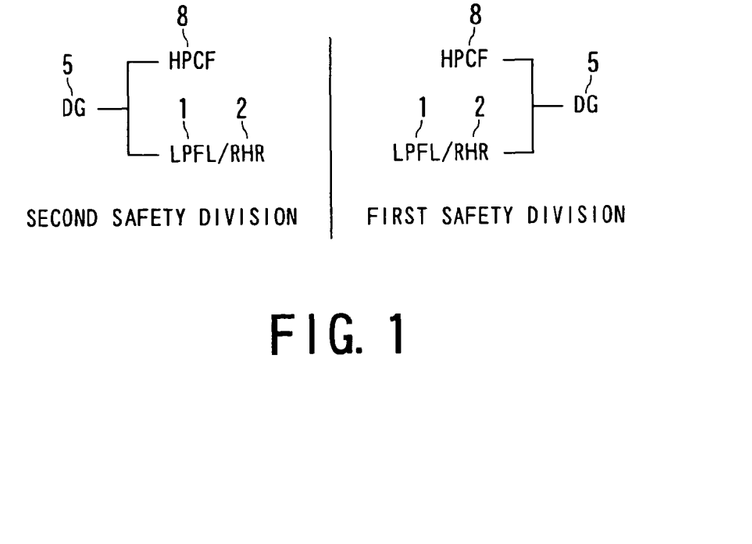
FIG. 1 is an illustration showing a front line of an emergency core cooling system (ECCS) according to a first embodiment of the present invention.

FIG. 1 is a schematic view of the structure of the high-pressure core cooling systems, the low-pressure core cooling systems, the residual heat removal systems, and the emergency power supplies. FIG. 2 is schematic view illustrating the safety performance of the ECCS according to this embodiment.

That is, as illustrated in FIG. 1, the active ECCS according to the first embodiment includes two (first and second) safety divisions. Each safety division includes a high-pressure core cooling system and a low-pressure core cooling system operated cooperatively with a residual heat removal system. The first and second safety divisions each include a high-pressure core flooding system (HPCF) 8 as a high-pressure core cooling system and a low-pressure flooding system (LPFL) 1 and a residual heat removal system (RHR) 2 as a low-pressure core cooling system.

Furthermore, as an emergency power supply for each safety division, an emergency diesel generator (DG) 5 is provided. Instead of the DG 5, an emergency gas turbine generator (GTG) may be used. When using a GTG, since a GTG does not include a cooling water system, reliability of the emergency power supply may increase.

The emergency power supply provided for each of the safety divisions may be a 100%-capacity power supply or, instead, may be two 50%-capacity power supplies. In other words, two small-sized emergency power supplies may be provided instead of one large-sized emergency power supply. It is hence to be noted that the HPCF 8 is an example of a high-pressure ECCS, and any other type of high-pressure ECCS may be used, and similarly, that the LPFL 1 is an example of a low-pressure ECCS, and any other type of low-pressure ECCS may be used.

The difference between the first embodiment and a known ECCS is that the active ECCS according to the first embodiment includes only two safety divisions. In this way, only two sets of the LPFL 1 and the RHR 2 and two emergency power supplies are required. Furthermore, a reactor core isolation cooling system (RCIC) included in a known ECCS is omitted in the active ECCS according to the first embodiment. Accordingly, the active ECCS according to the first embodiment is more cost efficient and takes up less space compared with an active ECCS of the known ABWR such as shown in FIGS. 6 and 7.

According to this embodiment, the total number of pumps is reduced to four, and the total number of heat exchangers for the residual heat removal system is reduced to two. A plant type emergency core cooling system known as a 'BWR/4' also has only two safety divisions. However, the large-diameter pipes of the external recirculation piping of the BWR/4 are subjected to a design-basis accident. Thus, the BWR/4 does not satisfy safety standards if it employs the system structure according to this embodiment. Therefore, to satisfy safety standards, the BWR/4 will must include a total of eight to ten pumps.

According to this embodiment, the safety standards are satisfied by combining the ECCS with a BWR plant not including external recirculation piping (i.e., an ABWR plant or any post-ABWR plant). The ABWR uses internal recirculation piping and does not include external recirculation piping. Therefore, the possibility of a pipe rupture accident occurring in the large-diameter pipes of the external recirculation piping can be eliminated. Accordingly, the reactor core will not be exposed even in a loss-of-coolant accident. In this way, an ABWR having an extremely high safety level is provided.

According to this embodiment, in the event of a design-basis accident, the reactor core is cooled only by the LPFL 1. Inherent safety is added to the ABWR by increasing the amount of water held inside the ABWR by increasing the length of the reactor pressure vessel by about two meters. In this way, the flooding of the reactor core can be maintained merely by the LPFL 1.

Figure 2:
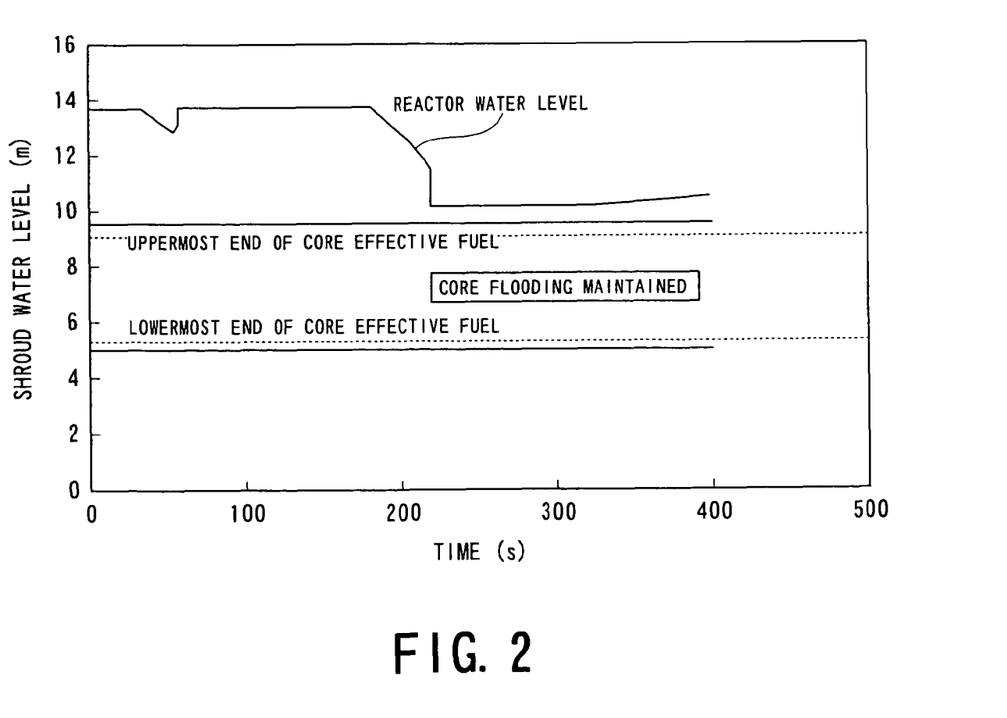
FIG. 2 is a schematic diagram of safety performance of the ECCS according to the first embodiment of the present invention.

FIG. 2 is a graph illustrating the analytical results of the change in water level inside the reactor during a design-basis loss-of-coolant accident. In FIG. 2, the vertical axis represents the water level inside a core shroud during a design-basis loss-of-coolant accident, and the horizontal axis represents time (seconds). As illustrated in FIG. 2, in the event of a loss-of-coolant accident, the water level of the reactor quickly becomes higher than the top of the effective fuel capacity of the reactor core. Accordingly, the core flooding is reliably ensured and maintained.

A second embodiment of an ECCS according to the present invention will be described hereunder with reference to FIG. 3.

Each of the safety divisions in an emergency core cooling system (ECCS) according to this embodiment includes an emergency gas turbine generator as an emergency power supply equipment for supplying electricity to the safety divisions. FIG. 3 illustrates the structure of a high-pressure core cooling systems, low-pressure core cooling systems, residual heat removal systems, and the emergency power supplies.

Figure 3:
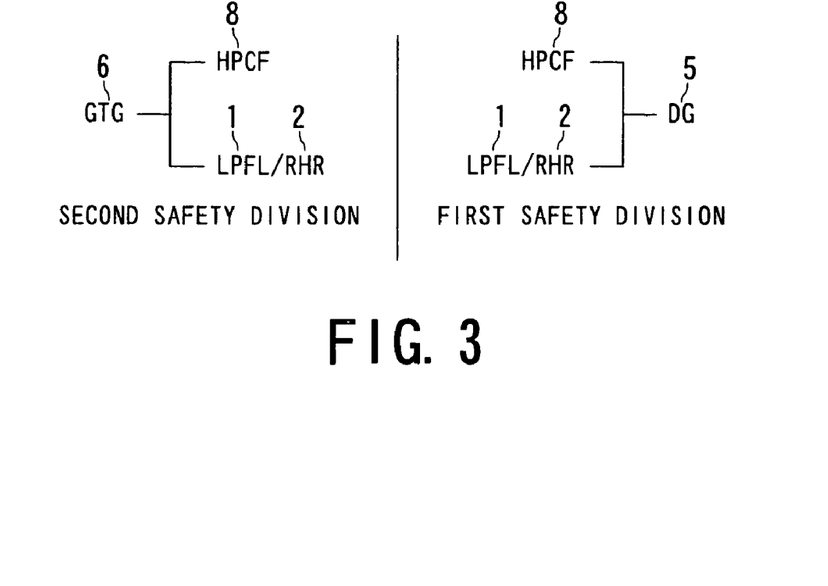
FIG. 3 is an illustration showing a front line of an ECCS according to a second embodiment of the present invention.

As illustrated in FIG. 3, similar to the first embodiment, first and second safety divisions each include a low-pressure flooding system (LPFL) 1 and a residual heat removal system (RHR) 2 as a low-pressure core cooling system and a high-pressure core flooding system (HPCF) 8 as a high-pressure core cooling system.

According to this embodiment, an emergency diesel generator (DG) 5 is disposed in the first safety division as the emergency power supply, and on the other hand, in the second safety division, a gas turbine generator (GTG) 6 is disposed as the emergency power supply. Structures of the ECCS, other than the above, according to this second embodiment are the same as the structures of the first embodiment.

According to the second embodiment, the reliability of the ECCS can be enhanced by using various types of emergency power supply equipments. As a modification or alternation of this embodiment, a GTG may be provided in each safety division as an emergency power supply equipment for supplying electricity. By using the GTG for each safety division, the same advantages as those of the ECCS according to the first embodiment will be obtainable.

Figure 4:
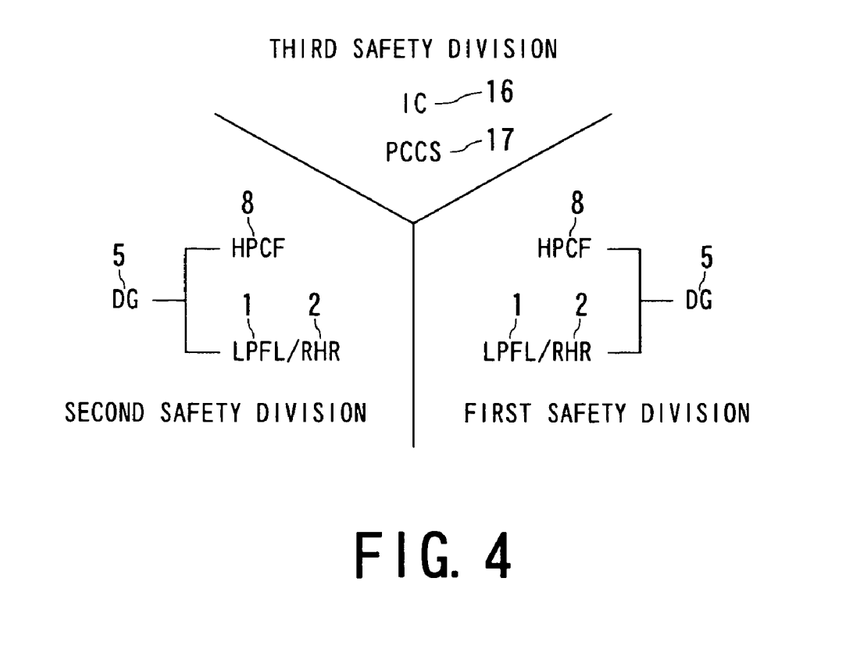
FIG. 4 is an illustration showing a front line of an ECCS according to a third embodiment of the present invention.

Next, an ECCS third embodiment of the present invention will be described with reference to FIG. 4. According to this third embodiment, a passive cooling system is provided in a third safety division. The passive cooling system disposed inside the third safety division includes a passive containment cooling system and an isolation condenser. FIG. 4 illustrates a high-pressure core cooling system, a low-pressure core cooling system, a residual heat removal system, an emergency power supply equipment, and a passive cooling system provided for each safety division. That is, in this third embodiment, the third safety division includes an isolation condenser (IC) 16 and a passive containment cooling system (PCCS) 17 as a passive cooling system.

As mentioned above, since the ECCS according to this third embodiment includes the IC 16, the ABWR plant can be maintained safely for a long time (e.g., about three days) even during a station black out, which is an incident having a significantly low incident rate in which both emergency power supplies for the first and second safety divisions and the external power supply fail simultaneously.

The ECCS according to this embodiment has only two sets of residual heat removal systems (RHR) 2 and, thus, has a less reliable containment vessel cooling system compared with the known ABWR having three sets of RHRs 2. However, by providing the PCCS 17, the reliability of the ECCS according to this embodiment can be enhanced.

Figure 5:
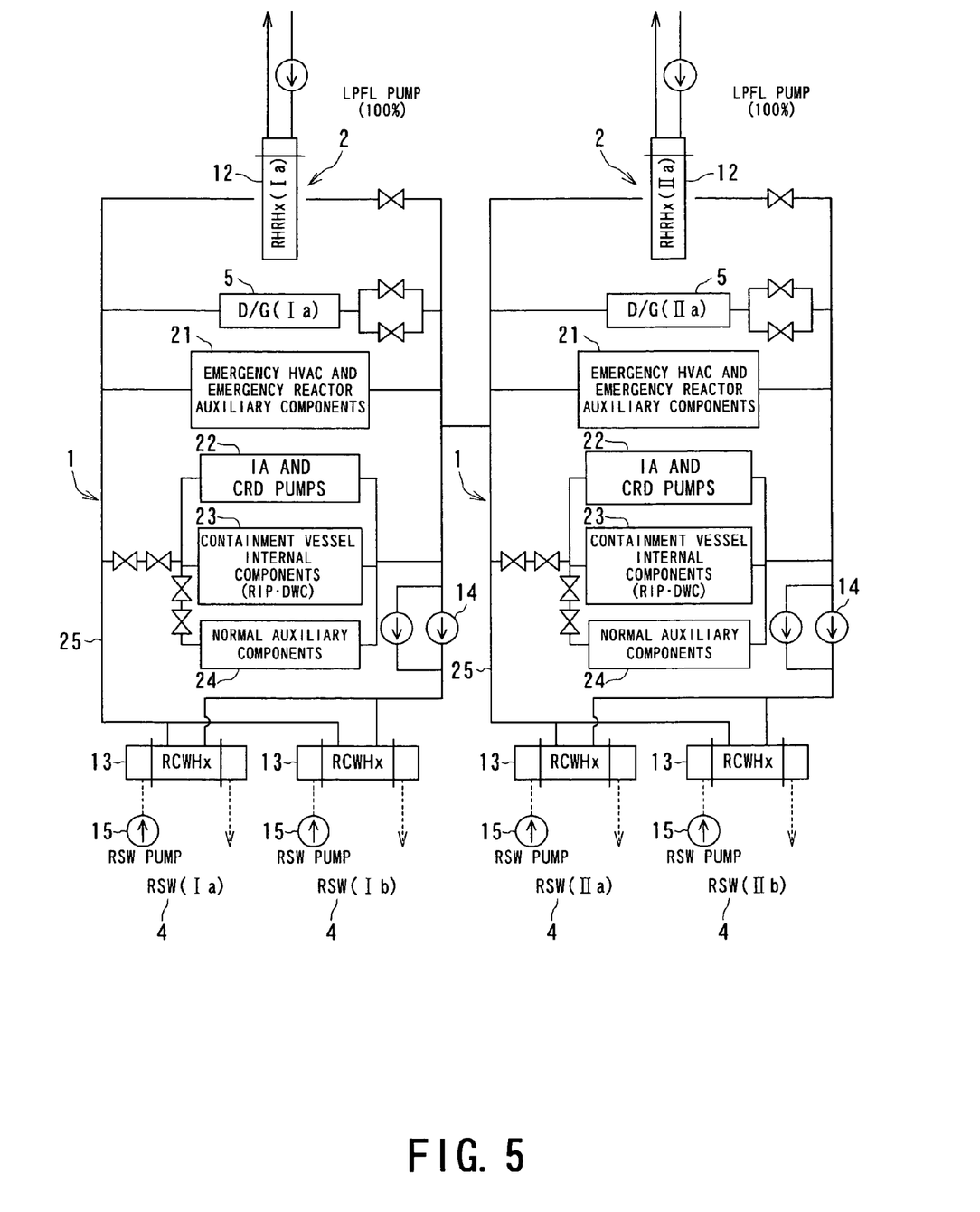
FIG. 5 is a schematic diagram of a support line of the ECCS according to the third embodiment of the present invention.

FIG. 5 illustrates the structure of a reactor component cooling system (RCW) 3 and a reactor component sea water cooling system (RSW) 4 according to a fourth embodiment of the present invention.

FIG. 5 illustrates two systems each including: an RHR heat exchanger 12; an RCW heat exchanger 13; RCW pumps 14; RSW pumps 15; an emergency heat-ventilating and air-conditioning system (HVAC) and emergency reactor auxiliary components 21; an IA and CRD pumps 22; containment vessel internal components (reactor internal pump (RIP) and drywell cooler (DWC)) 23; normal auxiliary components 24; and an RCW loop (circulation pipes) 25.

According to the fourth embodiment, the piping arrangement of the RCW 3 constitutes two loops, each including two RCW pumps 14. Further, two loops of piping for the RSW 4 are provided for each loop of piping for the RCW 3, and in other words, a total of four loops of piping for the RSW 4 are provided. One of the RSW pumps 15 is disposed in each loop of piping for the RSW 4.

An increased number of the RCW pumps 14 and the RSW pumps 15 may be arranged in each loop of piping for the RCW 3 and the RSW 4, respectively, as occasion demands. The piping of an RCW of a known ABWR comprises three loops, and each RCW pump for each RCW loop has a 50%-capacity (i.e., the entire system has an RCW pump capacity of 3×50%). In comparison, each of the RSW pumps 15 for each loop of piping for the RCW 3 according to this embodiment has a 100%-capacity (i.e., the entire system has an RCW pump capacity of 2×100%). In other words, according to the present invention, the RCW pump capacity of each loop has been increased from 50% to 100%.

According to this embodiment, two RCW pumps 15 are disposed in each loop of piping for the RCW 3, so that the entire system has an RCW pump capacity of 4×50%, wherein the capacity of each of the RCW pumps 15 is 50%. On the other hand, in a known ABWR, the entire system has an RCW pump capacity of 6×25%, wherein the capacity of each RCW pump is 25%. Thus, all the active components of the ABWR according to this embodiment operate in accordance with the system structure based on a pump capacity of 4×50%.

The required pump capacity of the ABWR according to this fourth embodiment of the structure described above is a 100%-capacity. In addition to satisfying this requirement, the ABWR has a safety allowance of 2×50%. Accordingly, the ABWR of this embodiment is capable of maintaining the excellent safety even in an event of an accident in which multiple failures of the active components of the ECCS occur or in which a single failure occurs while the systems are out of service.

The results of a probabilistic safety assessment (PSA) for the ECCS of the ABWR according to this embodiment in operation can be significantly improved in comparison with the results of the ECCS of the known ABWR. Furthermore, the RCW 3 and the RSW 4 of the ECCS according to this embodiment are allowed to be out of service for maintenance while the ABWR plant is in operation. In other words, it becomes unnecessary to shutdown the plant to carry out the maintenance of the RCW 3 and the RSW 4. Accordingly, the entire cooling system of the nuclear reactor can be put to a stand-by state while the ABWR plant is shutdown. Thus, the result of the PSA, while the ABWR plant is shutdown, can be significantly improved.

As described above, the reliability and safety of the entire system of the ECCS according to this embodiment can be significantly enhanced in comparison with the known ABWR by doubling the capacity per active component, such as a pump, in comparison with the capacity per active component of the known ABWR.

As described above, although the capacity per active component of the ECCS is increased, the number of loops of piping for the RCW 3 can be reduced to two loops instead of three loops as in the known ABWR. In this way, cost for production can be significantly reduced and cost efficiency of the ABWR plant can be hence increased. Such cost reduction can be achieved because the pipes for the RCW 3 of the ECCS are extremely high quality and have an aseismatic design, and the production cost of these pipes makes up a large percentage of the production cost for the entire ABWR plant.

Furthermore, according to this embodiment, on-line maintenance can be performed on the RSW 4 as a periodic maintenance program. Moreover, the time required for the periodic maintenance program can be shortened. For a periodic maintenance program of a known ABWR, the plant needs to be shutdown for about 45 days. For the ABWR according to this embodiment, it is possible to complete the periodic maintenance program in less than 30 days. In addition, both the safety and cost efficiency of the ABWR plant can be significantly enhanced.

Still furthermore, in this embodiment, although the two RCW pumps 14 are provided for each loop of RCW 3, the number of RCW pumps 14 may be increased to four, six, eight, . . . , so as to enhance the reliability of the RCW system. Similarly, the number of loops of piping for the RSW 4 and the number of RSW pumps 15 may be also increased so as to enhance the reliability of the RSW system.

It is to be noted that the present invention is not limited to the described embodiments and many other changes and modifications may be made without departing from the scopes of the appended claims.

What is claimed is:

1. An emergency core cooling system for a BWR plant not including external recirculation piping, comprising:
    an active emergency core cooling system consisting of only a first safety division and a second safety division, each of said first and second divisions including a high-pressure motor-driven core cooling system, and a low-pressure motor-driven core cooling system, which is commonly used as a residual heat removal system, a heat removal capacity of said residual heat removal system being not less than 100% of the necessary capacity to cool the core and the containment to meet a safety requirement at a design basis loss of coolant accident;
    a first emergency power supply equipment provided for the first safety division, the first emergency power supply equipment configured to supply electricity to the first safety division; and
    a second emergency power supply equipment provided for the second safety division, the second emergency power supply equipment configured to supply electricity to the second safety divisions;
    wherein said emergency core cooling system does not include additional safety divisions that contain an active emergency core cooling system, and
    wherein said emergency core cooling system meets the safety requirement at a design basis loss of coolant accident considering a single failure of any active components including said first or second emergency power supply equipment.

2. The emergency core cooling system according to claim 1, wherein the first power supply equipment is a first emergency diesel generator, and wherein the second power supply equipment is a second emergency diesel generator.

3. The emergency core cooling system according to claim 1, wherein the first power supply equipment is an emergency diesel generator, and wherein the second power supply equipment is an emergency gas turbine generator.

4. The emergency core cooling system according to claim 1, wherein the first power supply equipment is a first emergency gas turbine generator, and wherein the second power supply equipment is a second emergency gas turbine generator.

5. The emergency core cooling system according to claim 1, further comprising a passive cooling system comprising a, third safety division configured to physically separate said passive safety system from the active emergency core cooling system in the first and second safety divisions, said passive safety system including at least an isolation condenser to condense reactor steam and return condensate to the reactor in a high-pressure condition at a station blackout, wherein said active emergency core cooling system is configured to cool the core with said passive cooling system not operating.

6. A BWR plant comprising an emergency core cooling system comprising:
    an active emergency core cooling system consisting of only a first safety division and a second safety division, each of said first and second divisions including a high-pressure motor-driven core cooling system, and a low-pressure motor-driven core cooling system, which is commonly used as a residual heat removal system, a heat removal capacity of said residual heat removal system being not less than 100% of the necessary capacity to cool the core and the containment to meet a safety requirement at a design basis loss of coolant accident;
    a first emergency power supply equipment provided for the first safety division, the first emergency power supply equipment configured to supply electricity to the first safety division; and
    a second emergency power supply equipment provided for the second safety division, the second emergency pourer supply equipment configured to supply electricity to the second safety division;
    wherein said emergency core cooling system does not include additional safety divisions that contain an active emergency core cooling system, and said BWR plant does not include an external recirculation piping, and
    wherein said emergency core cooling system meets the safety requirement at a design basis loss of coolant accident considering a single failure of any active components including said first or second emergency power supply equipment.

7. The BWR plant according to claim 6, wherein the first power supply equipment is a first emergency diesel generator, and wherein the second power supply equipment is a second emergency diesel generator.

8. The BWR plant according to claim 6, wherein the first power supply equipment is an emergency diesel generator, and wherein the second power supply equipment is an emergency gas turbine generator.

9. The BWR plant according to claim 6, wherein the first power supply equipment is a first emergency gas turbine generator, and wherein the second power supply equipment is a second emergency gas turbine generator.

10. The BWR plant according to claim 6, further comprising a passive cooling system comprising a third safety division configured to physically separate said passive safety system form the active emergency core cooling system in the first and second safety divisions, said passive safety system including at least an isolation condenser to condense reactor steam and return condensate to the reactor in a high-pressure condition at a station blackout, wherein said active emergency core cooling system is configured to cool the core with said passive cooling system not operating.

* * * * *